S. L. BECK.
AUTOMOBILE SIGNAL DEVICE.
APPLICATION FILED MAR. 6, 1919.

1,325,777.

Patented Dec. 23, 1919.

Inventor,
S. L. Beck.
By John A. Bronnhardt
Attys.

UNITED STATES PATENT OFFICE.

SVEN L. BECK, OF CLEVELAND, OHIO, ASSIGNOR OF TWO-FIFTHS TO RALPH N. EGLESTON, OF CLEVELAND, OHIO.

AUTOMOBILE SIGNAL DEVICE.

1,325,777.     Specification of Letters Patent.     Patented Dec. 23, 1919.

Application filed March 6, 1919. Serial No. 280,881.

*To all whom it may concern:*

Be it known that I, SVEN L. BECK, a subject of the Government of Denmark, residing at Cleveland, in the county of Cuyahoga and State of Ohio, have invented certain new and useful Improvements in Automobile Signal Devices, of which the following is a specification.

This invention relates to signaling devices adapted to be attached to the rear of automobiles and the like, and has for its object the provision of a device which will acquaint the driver of the vehicle following the one to which it is applied with the intentions of the movements of the operator.

Other objects are the provision of a device which will be practically automatic in operation, that is, one which will not require especial attention on the part of the operator, one which will be simple and inexpensive of manufacture, attractive in appearance and easy of installation upon the automobile and one which will be very efficient in operation. Other and more limited objects will become apparent from the following description.

Figures 1, 2:
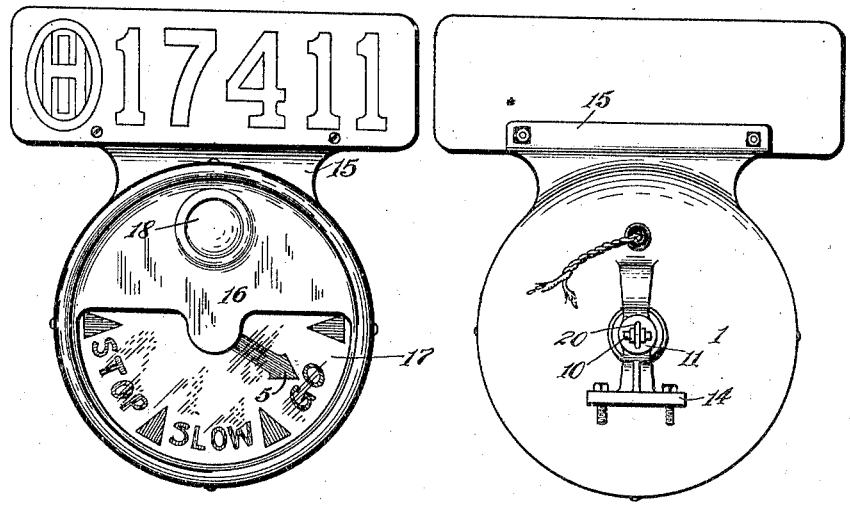
Figure 3:
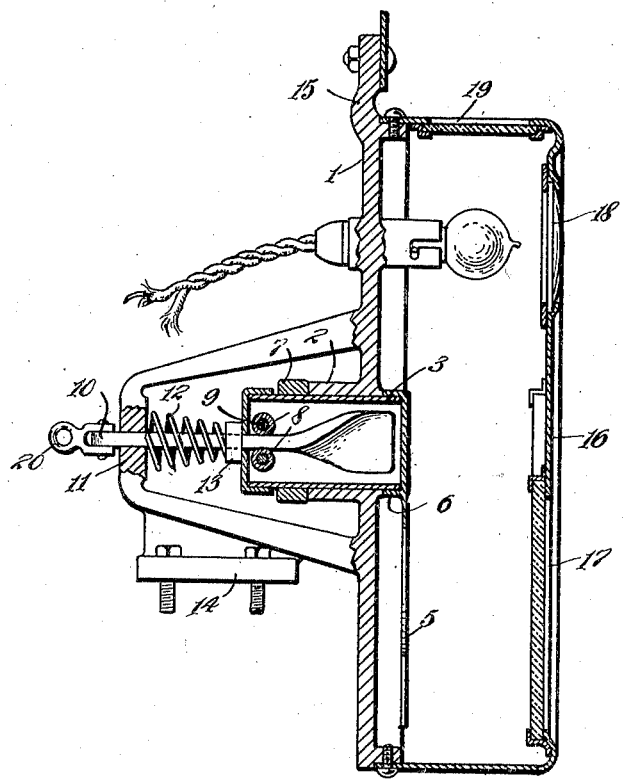

Referring to the drawings, Figure 1 is a front elevation of a device constructed in accordance with my invention. Fig. 2 is a rear elevation and Fig. 3 is an enlarged vertical section through the device.

A substantially circular casting 1 forms the base or body structure and has at its center a cylindrical boss 2 provided with a bore in which is rotatably mounted the tubular extension 3 of an indicating finger 5. The extension 3 is locked against longitudinal movement by an annular bead 6 formed with the finger 5 and a nut 7 threaded thereon. The part 3 has, at one end remote from the finger 5, transverse rollers 8, spaced equidistant from the center line. Shafts 9, having their ends securely fixed in the extension 3, support the rollers 8. An actuating bar 10, in the form of a piece of strap iron, having one of its planes bent at right angles to the other, has bearing in a bracket 11 formed integral with the base 1 and near its other end is supported between the rollers 8. A spring 12, having one of its ends bearing upon the bracket 11 and its other end upon a collar 13 locked to the bar 10 normally holds the indicating finger 5 in the position shown in Fig. 1, but when the bar 10, being locked against rotation due to the fact that it is rectangular in cross section, and occupies correspondingly shaped apertures in its bearings, is pulled in a direction opposite to the face of the device, it will cause the finger to rotate in a direction to point to the legend inscribed on the face of the casting 1, see Fig. 1, thus indicating the intentions of the driver.

A bracket 14 made integral with the casting 1 permits of attachment to the rearward part of the vehicle, a second bracket 15 allows for the attachment of a license number. A sheet metal cover 16 provided with openings 17, 18 and 19 provide, respectively, for the exposure of the legends, the application of the red danger signal, behind which is placed an electric light, secured in a receptacle formed with the base 1 and providing a means for illumination during the hours of darkness, and the illumination of the license number as required by law.

The bar 10 is shown as having a link 20 attached to its end for the application of a cable, not shown, which may have connection with the clutch pedal of the automobile, though this is but one of many ways of operating the device.

I claim:

1. A signal comprising a plate, a pointer having a tubular pivot in said plate, and a reciprocating operating bar having a spiral part located within and engaging said pivot and adapted to turn the same by reciprocation of the rod.

2. A signal comprising a plate, a pointer having a pivot tube arranged to turn in said plate, a pair of transverse parallel rollers in said tube, and a screw bar of high pitch, slidable axially between said rollers and adapted to turn the tube and pointer by such movement.

3. A signal comprising a back plate having a bearing, a pointer pivoted to swing in front of said plate, and a screw bar of high pitch, slidable in the plate at the pivotal axis of the pointer and engaging said pointer to swing the same as the bar is slid back and forth.

4. A signal comprising a back plate having a tubular bearing, a pointer on one side of said plate, having a tubular pivot in said bearing and a pair of parallel rollers extending across within said pivot, and a sliding bar at the other side of said plate, having a spiral part of high pitch engaged between said rollers and slidable axially with respect to the pivot.

5. A signal comprising a lamp casing having a back plate provided with a bearing, a rotary pointer in the casing, having a tubular pivot in said bearing, a slidable bar supported behind the plate and movable axially in said pivot and having inclined faces within and engaging the pivot to turn the same and swing the pointer by sliding the bar in and out.

In testimony whereof, I do affix my signature in presence of two witnesses.

SVEN L. BECK.

Witnesses:
 JOHN A. BOMMHARDT,
 G. W. ROSENBERG.